March 6, 1951     A. BOUWERS     2,544,413
OPTICAL LENS SYSTEM COMPRISING ONE OR
MORE ASPHERICAL REFRACTING SURFACES
Filed Jan. 3, 1946
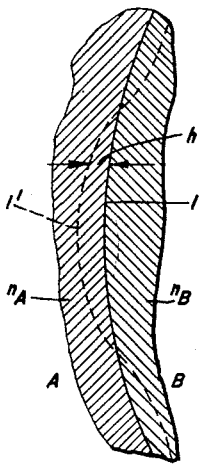
FIG. 1
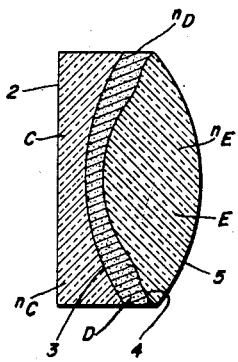     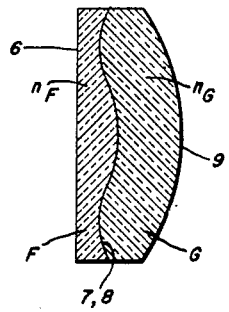
FIG. 2     FIG. 3
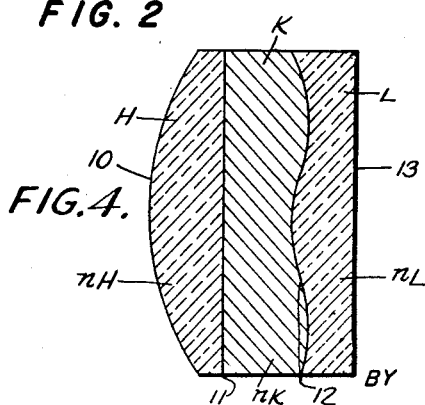
FIG. 4
INVENTOR
ALBERT BOUWERS
BY
ATTORNEYS Patented Mar. 6, 1951

2,544,413

UNITED STATES PATENT OFFICE 2,544,413

OPTICAL LENS SYSTEM COMPRISING ONE OR MORE ASPHERICAL REFRACTING SURFACES

Albert Bouwers, Delft, Netherlands, assignor to N. V. Optische Industrie "De Oude Delft," Delft, Netherlands Application January 3, 1946, Serial No. 638,768
In the Netherlands September 5, 1942

Section 1, Public Law 690, August 8, 1946
Patent expires September 5, 1962

6 Claims. (Cl. 88—57)

The use of one or more aspherical refractive surfaces in a series of lenses has advantages in certain cases because in designing the series of lenses it renders available more degrees of freedom than in the case of a series of lenses having only spherical or flat circumscribing surfaces. The use of aspherical refractive surfaces generally, however, entails difficulty because the manufacture of such surfaces is beset with difficulty on account of the requisite accuracy.

It is also known with a series of lenses to cause the refractive indices for the mean wavelength of the light used to differ but little on either side of a refractive surface, for example by 0.15 in the use of a cement surface between crown and flint glass.

The present invention is based on recognition of the fact that in a series of lenses the simultaneous use of at least one aspherical refractive surface and of a small difference between the refractive indices on either side of that surface has certain advantages. The series of lenses according to the invention, in which at least one aspherical refractive surface is provided, is so constructed that the refractive indices for the mean wavelength of the light used differ by at most 0.3 on either side of the said surface.

In order that the invention may be clearly understood and readily carried into effect it will now be described more fully with reference to the accompanying drawing.

Fig. 1 is a sectional view of two media with a refractive surface therebetween illustrating the advantages of the invention by an example showing a theoretically correct surface and a surface which may actually be obtained in lens grinding;

Fig. 2 is a sectional view of one embodiment of the invention;

Fig. 3 is a sectional view of another embodiment of the invention; and

Fig. 4 is a sectional view of a further embodiment of the invention.

Figure 1 shows an aspherical refractive surface $I$. Due to not very accurate operation by which the surface is obtained and which lack of accuracy practically always occurs the surface manifests differences with the surface that should actually have been obtained, said theoretically correct surface being indicated in this figure by dotted lines $I'$. The surface $I$ constitutes the circumscribing surface between two media A and B, said media being possessed of refractive indices $n_A$ and $n_B$. The product $(n_A - n_B) \cdot h$ is decisive for the optically correct action of the refractive surface, $h$ designating the divergence between the actual surface $I$ and the theoretically correct surface $I'$. If therefore the refractive index difference $n_A - n_B$ is small, then $h$ may be comparatively large, whilst at the same time a small value of the product $(n_A - n_B) \cdot h$ and thus a surface which optically is sufficiently accurate is retained. Even the maximum value indicated for the refractive index difference is found in practice to give adequate results. The smaller, however, this difference, for example less than 0.2 or 0.15, the larger the inaccuracies admissible in the manufacture of the aspherical surface and even then the optical properties of the series of lenses that comprises such a surface are satisfactory.

According to a preferred form of construction of the series of lenses according to the invention, this series comprises two components one of whose adjacent surfaces is spherical or flat, whereas the other is aspherical and the space enclosed by the said surfaces is entirely provided with a transparent cement or transparent liquid.

One example of such a series of lenses is shown in Fig. 2. It comprises a plano-concave lens C whose surface 2 is flat and the surface 3 is spherical and the component E whose surface 4 is aspherical and convex and the surface 5 is spherical and convex. The space enclosed between the adjacent surfaces 3 and 4 of the components C and E is entirely provided with the transparent cement D. The refractive indices of the components C and E and of the supply of cement D are $n_C$, $n_E$ and $n_D$ respectively. In this form of construction the advantage stated hereinbefore occurs at the area of the circumscribing surface between the mass of cement D and the aspherical circumscribing surface 4 of the lens E which is in intimate contact therewith. In the present case, the refractive index difference for the mean wavelength of the light used between the component E and the cement D is $n_E - n_D = 0.02$.

In the present case the mass D is formed by transparent cement which has the property of sticking together the components C and E. It may be formed for example by Canada balsam, synthetic or natural resins and gelatine. If the mass D is not required to have a sticking effect on the components C and E it may suffice to use a transparent liquid of properly chosen refractive index. In certain cases even water may be used. Naturally, in this case the components C and E will be arranged in a setting which is perfectly tight for the particular liquid.

According to the invention, if a mouldable transparent cement is used as an adhesive between the two components, the series of lenses shown in Fig. 2 may be manufactured in a simple manner by applying a supply of the said cement in a mouldable state to the surface of one of the components, preferably to the surface 3 of component C and by then forcing the other component, in the present case the component E, in such manner into the cement D that the space between the two components is entirely provided with the cement.

In a further favourable form of construction of the series of lenses according to the invention the adjacent surfaces of two components are constructed to be so aspherical that they fit into each other accurately and the remaining space between these surfaces is provided with a transparent cement or a transparent liquid. An example of such a series of lenses is shown in Fig. 3 in which the component F having the refractive index $n_F$ is possessed of a flat surface 6 and an aspherical surface 7 and the component G has a likewise aspherical surface 8 fitting accurately into the aspherical surface 7 of the component F and a spherical convex surface 9. The refractive index of the component G is designated $n_G$. The surfaces 7 and 8 of the components F and G are separated by an extremely thin layer of a transparent cement not shown in the drawing. Between the refractive indices $n_F$ and $n_G$ there is a difference of 0.25 and the refractive index of the cement film is comprised between the values of $n_F$ and $n_G$. In this case it is, however, not necessary for the refractive index of the cement film between the surfaces 7 and 8 to differ by less than 0.3 from the refractive indices of the components F and G, because the surfaces 7 and 8 jointly form a single surface from the optical view-point and it is frequently necessary for a satisfactory operation of the series of lenses that the refractive indices of $n_F$ and $n_G$ should differ by 0.3 at the most.

In Fig. 4 a further embodiment of the invention is represented. The two lens elements H and L are placed at some distance from each other, the space between these elements being filled with a transparent medium K.

The lens element H has a spherical surface 10 and a plane surface 11. The lens element L has the aspherical surface 12 and the plane surface 13.

The indices of refraction $n_H$, $n_K$ and $n_L$ meet the requirement set forth to give the difference in indices of refraction between the medium K and the element H a value less than about 0.3.

It is obvious that the invention cannot only be utilized successfully if the inaccuracies of the circumscribing surfaces used due for example to the grinding operation are to be corrected but also in those cases in which the operation used for the manufacture of the components causes inaccuracies by itself, as in the case for example of the components being manufactured in a templet by a moulding operation.

What I claim is:

1. A lens system having an optical axis and comprising two lens elements, one of said elements having an aspherical refractive surface of rotational symmetry with respect to said axis, the other said lens element having a surface complementary to said aspherical surface, and a transparent cement binding together said lenses at said surfaces with said surfaces in substantial coincidence thereby forming a substantially single aspherical refractive surface of rotational symmetry with respect to said axis, the refractive indexes of said two lens elements differing by less than about 0.3.

2. A lens system having an optical axis and comprising two lens elements, one of said elements being a plano-concave lens and the other of said elements having a convex aspherical surface and a convex spherical surface, said elements being spaced from one another, said convex aspherical surface facing said concave portion of said first said lens, said aspherical surface being rotationally symmetrical with respect to said axis, and a transparent medium interposed between said elements and filling the space therebetween, said medium having a surface coincident with said aspherical surface, the indexes of refraction of said medium and of the said other said element differing from each other by less than about 0.3.

3. A lens system having an optical axis and comprising two lens elements, one of said elements having a plane surface and an aspherical refractive surface of rotational symmetry with respect to said axis, the other of said lens elements having a surface complementary to said aspherical surface and a spherical convex surface, and a transparent cement binding together said lenses at said aspherical surfaces with said surfaces in substantial coincidence thereby forming a substantially single aspherical refractive surface of rotational symmetry with respect to said axis, the refractive indexes of said two lens elements differing by less than about 0.3 and the refractive index of said cement being intermediate the indexes of refraction of said two lens.

4. A lens system having an optical axis and comprising two lens elements, one of said elements having an aspherical surface, said elements being spaced from one another, said aspherical surface facing a surface of the other said lens element, said aspherical surface being rotationally symmetrical with respect to said axis and a transparent medium being interposed between said elements and filling the space therebetween, said medium having a surface coincident with said aspherical surface, the indexes of refraction of said medium and of the other said element differing from each other by less than about 0.3.

5. A lens system having an optical axis and comprising two lens elements, one of said elements having an aspherical surface thereon and the other of said elements having a plane surface thereon, said elements being spaced from one another, said aspherical surface facing said plane surface of the other said lens element, said aspherical surface being rotationally symmetrical with respect to said axis, and a transparent medium interposed between said elements and filling the space therebetween, said medium having a surface coincident with said aspherical surface, the indexes of refraction of said medium and of the said other said element differing from each other by less than about 0.3.

6. A lens system having an optical axis and comprising two lens elements, one of said elements having an aspherical surface thereon and the other of said elements having a spherical surface thereon, said elements being spaced from one another, said aspherical surface facing said spherical surface of the other said lens element, said aspherical surface being rotationally symmetrical with respect to said axis, and a transparent medium interposed between said elements and filling the space therebetween, said medium having a surface coincident with said aspherical surface, the indexes of refraction of said medium and of the said other said element differing from each other by less than about 0.3.

ALBERT BOUWERS.

REFERENCES CITED

The following references are of record in the file of this patent:

UNITED STATES PATENTS

| Number | Name | Date |
|---|---|---|
| 805,438 | Bell | Nov. 28, 1905 |
| 934,579 | Straubel et al. | Sept. 21, 1909 |
| 993,812 | Aitchison | May 30, 1911 |
| 1,507,212 | Silberstein | Sept. 2, 1924 |
| 1,659,966 | Tillyer | Feb. 21, 1928 |
| 2,092,789 | Tillyer | Sept. 14, 1937 |
| 2,100,290 | Lee | Nov. 23, 1937 |
| 2,100,291 | Lee | Nov. 23, 1937 |
| 2,332,930 | Rinia | Oct. 26, 1943 |
| 2,382,660 | Penberthy | Aug. 14, 1945 |
| 2,415,211 | Law | Feb. 4, 1947 |